Patented Aug. 27, 1940

2,212,825

UNITED STATES PATENT OFFICE 2,212,825

NITRO-TRIFLUOROMETHYL-ARYL AMINES AND PROCESS FOR MAKING THEM

Herbert W. Daudt, Wilmington, Del., and Harold E. Woodward, Penns Grove, N. J., assignors to E. I. du Pont de Nemours & Company, Wilmington, Del., a corporation of Delaware No Drawing. Application December 31, 1937, Serial No. 182,800

12 Claims. (Cl. 260—571)

This invention relates to new N-substituted nitro-amino benzotrifluorides and to methods of manufacturing the same.

It has been found that N-substituted nitro-amino benzotrifluorides are valuable negatively substituted compounds which can be used as dyes for acetate silk or as intermediates from which other compounds can be made. For example, the nitro group or groups can be reduced to amino to provide diazotizable primary amines. The diazotized amines couple readily with azo dye coupling components forming colored compounds which can also be used as dyes and for other purposes.

It is among the objects of the present invention to provide N-substituted nitro-amino benzotrifluorides which are obtainable by aminating a nitro-halo-benzotrifluoride containing at least one and not more than two nitro groups and not more than two trifluoromethyl groups, in which at least one ortho or para position to halogen is occupied by one of the group nitro or trifluoromethyl. The aminating in which halogen is displaced by the amide radical is done by the action of an amine having the general formula

in which $R_1$ is hydrogen, alkyl or aralkyl and $R_2$ is alkyl, aryl or aralkyl. When $R_2$ is aryl, the aryl may be benzene or naphthalene, which aryl is unsubstituted or is substituted as by alkyl, alkoxy, hydroxy, halo, amino, acylamino or azo-benzene. Another object of the invention is to provide processes for producing the compounds. Still other objects of the invention will be apparent from the following description.

The objects of the invention are attained in general by aminating nitro-halo-benzotrifluorides with alkyl, aryl or aralkyl amines.

The invention will be more fully set forth in the following more detailed description which includes examples that are given as illustrative embodiments of the invention and not as limitations thereof.

Example 1

50 parts of 3,5-dinitro-2-chloro-benzotrifluoride were dissolved in anhydrous ether (1000 parts). A slow stream of mono-methylamine gas was passed into the solution for about 12 hours. The operation was carried out at 25°–28° C. Care was taken to prevent undue losses of the solvent by avoiding the addition of excessive amounts of methylamine gas. Compensations were made for solvent losses by occasional additions of more ether.

An insoluble white residue which had formed was removed by filtration. It comprised methylamine hydrochloride.

The yellow colored filtrate was evaporated to dryness. Yellow crystals, which upon purification from a suitable solvent melted in the range 68°–69° C., remained. The product consisted essentially of 3,5-dinitro-N-methyl-2-amino-benzotrifluoride which is represented by the formula

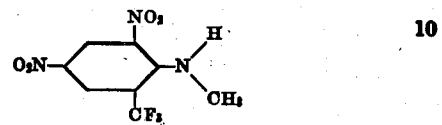

The above product was used to dye acetate silk. Yellow shades were obtained.

3,5-dinitro-2-chloro-benzotrifluoride is a crystalline compound melting in the range 57° to 59° C. and can be made by the dinitration of ortho-chloro-benzotrifluoride.

Example 2

3,5 - dinitro - 2 - chloro - benzotrifluoride (200 parts) were dissolved in benzene (6500 parts) and the solution treated with dimethylamine gas under operating conditions similar to those used in Example 1.

There was obtained a yellow crystalline product which, upon purification, melted about 55° C. This product comprised 3,5-dinitro-N-dimethyl-2-amino-benzotrifluoride. Acetate silk dyeings were yellow in shade.

In another operation a pressure of 15–30 lbs. per sq. inch was maintained in a closed vessel. The same product was obtained.

Example 3

3,5-dinitro-N-dimethyl-4-amino - benzotrifluoride was prepared by condensing 3,5-dinitro-4-chloro-benzotrifluoride with dimethylamine under conditions which were similar to those of Example 2.

Example 4

A dinitro-N-methyl-3-amino - benzotrifluoride was similarly prepared by treating a dinitro-m-chloro-benzotrifluoride with methylamine under conditions similar to those of Example 2.

Example 5

3,5- dinitro-N-ethyl - 4 - amino-benzotrifluoride was obtained by condensing 3,5-dinitro-4-chloro-benzotrifluoride (prepared by dinitrating p-chloro-benzotrifluoride) with ethylamine by a procedure similar to that of Example 1.

Example 6

5-nitro-2-chloro - benzotrifluoride (30 parts) was added to a solution of methylamine (33 parts) in ethyl alcohol (300 parts) which was contained in a copper lined autoclave. After the addition of 0.5 part cuprous chloride to the mixture, the autoclave was closed and the charge of reactants was heated to 115°–120° C. during an hour and was then maintained in this temperature range for eight hours.

The cooled reaction charge was filtered. The solvent was removed by evaporation. The residue was subjected to steam distillation for half an hour. The solid material in the residue was removed by filtration and subsequently subjected to crystallization from a suitable solvent. 5-nitro-N-methyl-2-amino-benzotrifluoride was obtained.

Example 7

3-nitro-N-dimethyl-4-amino-benzotrifluoride was prepared by amidating 3-nitro-4-bromo-benzotrifluoride with dimethyl-amine under the conditions of Example 6.

Example 8

3,5-dinitro-6-chloro-benzotrifluoride (20 parts) was dissolved in anhydrous ether (200 parts) and aniline (20 parts) was added during a period of 5 minutes. The resulting solution deposited a crystalline mass upon standing at room temperature. After 24 hours standing of the reaction mass at room temperature the crystals were removed by filtration. They were identified as aniline hydrochloride.

The filtrate was extracted three times with about 100 parts of 5% hydrochloric acid. An orange red crystalline mass resulted upon the removal of the solvent by evaporation. These crystals, upon purification by crystallization from alcohol, melted at approximately 137° C. They dyed acetate silk orange shades of yellow.

The product comprised 4,6-dinitro-2-(trifluoromethyl) diphenylamine which is represented by the formula

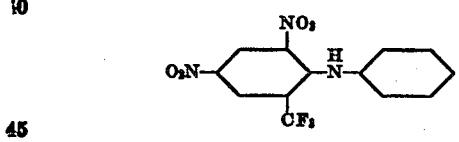

Example 9

The procedure of Example 8 was applied to the preparation of other diphenylamine derivatives by condensing the same dinitro-chloro-benzotrifluoride with ring substituted derivatives of aniline. In all cases, the aryl amine was used in molecular proportions that were at least twice those of the dinitro-chloro-benzotrifluoride. Unless otherwise stated, the reactions were carried out under essentially the same temperature conditions. The hydrochlorides of the aniline derivative (starting material) and the substituted diphenylamine, per se, were isolated in essentially the same manner. All of the products which are shown below dyed acetate silk shades of yellow or orange.

(a) 4,6-dinitro-2-(trifluoromethyl)-4'-hydroxy-diphenylamine which is represented by the formula

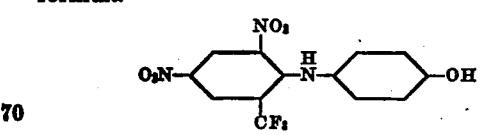

was prepared by aminating for 24 hours with p-amino phenol in ether. The melting range of the purified product was about 120° C.

(b) 4,6,-dinitro-2-(trifluoromethyl)-4'-methoxy-diphenylamine which is represented by the formula

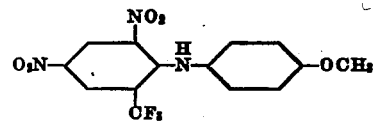

was prepared by aminating 12 hours with anisidine in benzene medium. The melting range of the purified product was about 105° C.

(c) 4 (4',6'-dinitro-2'-(trifluoromethyl)-diphenylamine)-azo-benzene which is represented by the formula

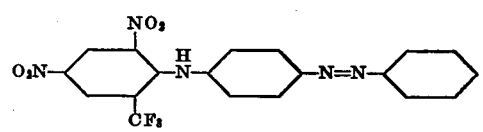

was prepared by aminating 48 hours with p-amino azo benzene in ether medium. The melting point was approximately 140° C.

Example 10

Mono-molecular proportions of 3,5-dinitro-2-chloro-benzotrifluoride, p-anisidine and dimethyl aniline were treated as described in Example 8. The dimethyl aniline acted as a hydrogen chloride acceptor, its hydrochloride being formed.

Similar products were obtained in accordance with Examples 9 and 10 with isomeric dinitro-chloro-benzotrifluorides and with corresponding dinitro-bromo-benzotrifluorides.

Example 11

A mixture of 3,5-dinitro-2-chloro-benzotrifluoride (100 parts) xylene (2500 parts) and mono ethyl aniline (600 parts) was boiled under a reflux condenser for 14 hours. The cooled reaction mass was extracted four times with 20% hydrochloric acid. The xylene was evaporated from the non-aqueous solution. The residue consisted of N-ethyl-4,6-dinitro-2-(trifluoromethyl)-diphenylamine. When purified by crystallization from alcohol it melted at approximately 135° C. The product is represented by the formula

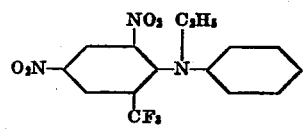

Example 12

Alpha-naphthyl-(4,6-dinitro-2-(trifluoromethyl)-phenylamine was prepared by condensing 3,5-dinitro-2-chloro-benzotrifluoride with alpha naphthylamine under conditions like those of Example 8. The product dyed acetate silk orange-yellow shades and is represented by the formula

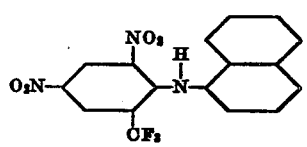

Alpha-naphthylamine hydrochloride was a by-product.

The use of beta naphthylamine in place of alpha naphthyl-amine produces an isomeric compound. By using a 4-alkoxy-1-naphthylamine instead of alpha naphthylamine a product represented by the following formula was produced.

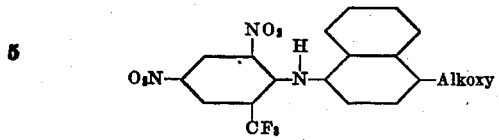

Example 13

5 - nitro - 2 - chloro-benzotrifluoride (5 parts) was dissolved in p-phenetidine (20 parts) and the mixture was heated to its boiling point for five minutes.

The completed charge was drowned in water (400 parts), and the unconsumed reacting components were removed by steam distillation of the charge which had been treated with a small amount of alkali.

4-nitro-2-(trifluoromethyl)-4'-ethoxy-diphenylamine was obtained. The product is represented by the following formula

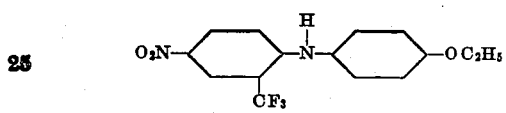

The product dyed acetate silk light yellow shades. The reduction of a portion of this product produced 4-amino-2-(trifluoromethyl)-4'-ethoxy diphenylamine. The last named compound gave a blue color when its acid solution was treated with ferric chloride. Its diazotized product formed colored compounds when coupled to the following coupling intermediates.

| Coupling component | Color of product |
|---|---|
| R-salt | Reddish blue color. |
| Anilide of b-oxy naphthoic acid | Blue color. |
| Alpha naphthylamine | Do. |

4 - nitro - 2 - (trifluoromethyl) diphenylamine was prepared in the manner described in the foregoing example by condensing 5-nitro-2-chloro-benzotrifluoride with aniline.

By using an equivalent amount of alpha naphthylamine instead of p-phenetidine in Example 13, 4-nitro-2-(trifluoromethyl)-phenyl alpha naphthylamine was prepared.

By using an equivalent amount of 4-methoxy-1-naphthylamine instead of p-phenetidine in Example 13, 4-nitro-2-(trifluoromethyl)-phenyl-4-methoxy naphthylamine was prepared.

The latter two compounds were reduced to the corresponding amino derivatives. These amines were diazotized and coupled to various azo dye coupling components among which were those mentioned in Example 13. The amino compounds are represented by the formulae

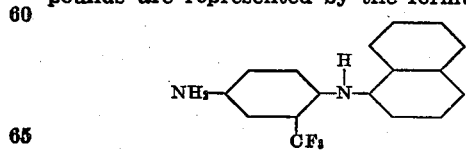

Example 14

A mixture of 5-nitro-2-chloro-benzotrifluoride (20 parts) ethyl aniline (60 parts) and xylene (800 parts) was boiled for 36 hours under a reflux condenser. N-ethyl-4-nitro-2-(trifluoromethyl)-diphenylamine was produced. Its formula is

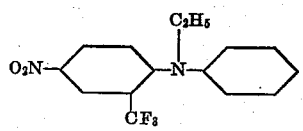

Example 15

Other dinitro-(trifluoromethyl) diphenylamines were prapared by condensing 3,5-dinitro-2-chloro-benzotrifluoride with an excess of each of the following amines: Cresidine, 2,5-dimethoxy aniline, benzidine, dianisidine, p-phenetidine, N-beta ethanol aniline and di-ethanolamine.

Example 16

Still other nitro-(trifluoromethyl) diphenylamines were prepared by condensing 4-nitro-2-chloro-benzotrifluoride with p-phenetidine, o-anisidine, 2,5-dimethoxy aniline, benzidine, dianisidine, N-beta ethanol aniline and di-ethanolamine.

Nitro-halo-benzotrifluorides in which at least one nitro group or one $CF_3$ group is ortho or para to the halogen can be aminated with amines. Preferably, one of these groups nitro and trifluoromethyl is ortho and the other is para, or both groups are ortho to the active halogen. The benzene nucleus may be substituted by one or two nitro groups, or by one or two $CF_3$ groups. Any halogen can be used, for example, chlorine, bromine, iodine or fluorine. Other substituent groups such as alkoxy and additional halogen may also be present. If the starting material contains more than one halogen in positions which are ortho or para to a nitro or $CF_3$ group it is possible to replace one or both of the halogens with an N-substituted amino group.

As aminating agents primary alkyl amines, primary aryl amines, primary aralkyl amines, N-mono alkyl arylamines and di-alkylamines can be used in which the alkyl groups preferaby contain not more than 5 carbons, and the aryl groups are from the benzene and naphthalene series. These alkyl and aryl groups may be unsubstituted or they may be substituted as by halogen, amino, alkyl, primary or secondary amino or acyl amino, alkoxy and hydroxy may be present in the alkyl group or in the benzene or naphthalene nuclei. The azo group may also be present in the aryl nuclei, for example azobenzene and azo-naphthalene groups.

As examples among the many other aminating agents which may be used meta-amino-monoethyl aniline, para-amino-dimethylaniline, ortho- and para-toluidine, para-bromo aniline and meta-chloro aniline are mentioned.

Diluents other than those described in the examples, may be used. Preferably, the diluent should be inert to both of the reacting components. As examples of other solvents the following are mentioned: Methyl alcohol, ethyl alcohol, ether, chloroform, benzene, toluene, xylene and other hydrocarbon solvents. The presence of catalysts, such as copper salts, are advantageous in carrying out some of the amidations at lower temperatures and pressures than would otherwise be required. Inert hydrogen halide acceptors, such as tertiary bases, for example dimethyl aniline may also be added.

The temperatures of the reactants may be varied over a fairly wide range depending upon the reactivity of the starting nitro or dinitro chloro-benzotrifluoride. Ordinarily, temperatures of 110°–180° C. are desirable for the amination of mononitro-halo-benzotrifluorides and temperatures of 20°–150° C. for the amination of dinitro-halo-benzotrifluorides. The basicity of the amine also has an influence on the choice of the temperature range. The less basic amines in general require higher temperatures. In general, the dinitro-halo-benzotrifluorides react more readily than the mon-nitro-halo-benzotrifluorides. The pressure may be equal to or may exceed the atmospheric pressure. The use of super-atmospheric pressure is of particular advantage when low boiling diluents are used, when the reaction is carried out at relatively high temperatures or when a volatile amine is added to the reaction mass in the form of a gas or vapor.

From the foregoing description it will be evident that nitro-N-alkylamino-benzotrifluorides, nitro-N-dialkyl-amino-benzotrifluorides, nitro-(trifluoromethyl)-diphenylamines, nitro-(trifluoromethyl)-phenyl-naphthylamines and N-alkyl-nitro-(trifluoromethyl)-diphenylamines have been produced in accordance with the invention by aminating the described mono- and dinitro-halo-benzotrifluorides in which $CF_3$ and $NO_2$ are in one or more of the positions 2, 4 and 6 to chloro, said aminating agents being mono-alkyl amines, dialkyl amines, primary aryl amines of the benzene series, primary aryl amines of the naphthalene series and N-alkyl aryl amines respectively. These compounds can be represented by the general formula

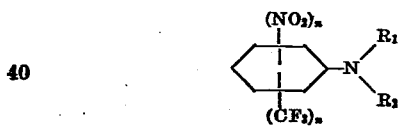

in which $R_1$ and $R_2$ have the values hereinbefore set forth and the $n$'s are the integers 1 or 2.

By reducing one or two of the nitro groups of the described products by the methods well known in the art, the corresponding mono-amino, nitro-monoamino and diamino compounds are producible which as shown in the foregoing specification are diazotizable, and capable of being coupled with coupling components.

Among the preferred embodiments of the invention are the 4-nitro-2-trifluoromethyl-4'-alkoxy-diphenylamines which have properties as intermediates for blue azo dyes. The preferred type is represented by the formula

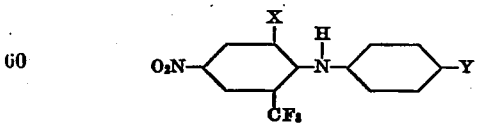

in which X is one of the group consisting of hydrogen and nitro and Y is halogen, hydroxy or alkoxy.

Amidation is the process of treating a halo derivative with an amino derivative and displacing the halogen by an amino group.

Since from the foregoing description of the invention it will be apparent to those skilled in the art that various other embodiments of the invention may be made without departing from the spirit and scope thereof, it is to be understood that no limitations are intended except those which are specifically recited in the annexed claims or are imposed by the prior art.

We claim:

1. As new compounds the members of a group consisting of mono-nitro-N-substituted amino benzotrifluorides and dinitro-N-substituted amino benzotrifluorides represented by the formula

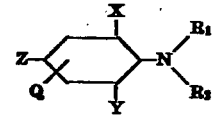

in which X is one of the group consisting of nitro and trifluoromethyl, Y is one of the group consisting of hydrogen and nitro, Z is trifluoromethyl when X is nitro and is nitro when X is trifluoromethyl, $R_1$ is one of the group consisting of hydrogen and alkyl having 1 to 5 carbons, $R_2$ is one of the group consisting of alkyl having 1 to 5 carbons and aryl, said aryl radicals being members of the benzene and naphthalene series, and Q is one of the group consisting of hydrogen and trifluoromethyl.

2. The compounds in accordance with claim 1 in which $R_2$ is an aryl of the benzene and naphthalene series.

3. The dinitro-N-substituted amino benzotrifluorides represented by the formula

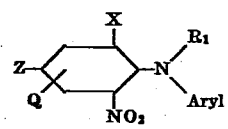

in which X is one of the group consisting of nitro and trifluoromethyl, Z is trifluoromethyl when X is nitro and is nitro when X is trifluoromethyl, Q is one of the group consisting of hydrogen and trifluoromethyl, $R_1$ is one of the group consisting of hydrogen and alkyl having 1 to 5 carbons and aryl is a member of the benzene and naphthalene series.

4. A compound represented by the formula

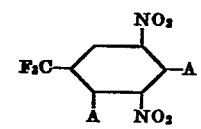

in which one A is hydrogen and the other A is the group -NH aryl wherein aryl is a radical of the benzene and naphthalene series.

5. A compound represented by the formula

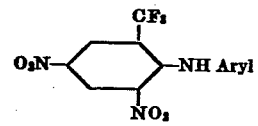

in which aryl is a radical of the benzene and naphthalene series.

6. A compound represented by the formula

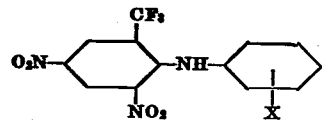

in which X is one of a group consisting of hydrogen, halogen, hydroxy and alkoxy.

7. A compound represented by the formula

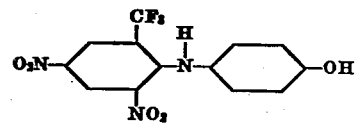

8. A compound represented by the formula

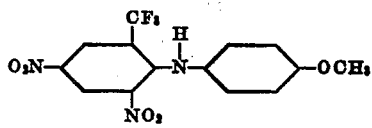

9. A compound represented by the formula

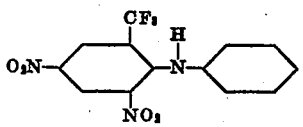

10. The process which comprises aminating a nitro-halo-benzotrifluoride containing not more than two nitro groups and not more than two trifluoromethyl groups, and in which at least one of the positions ortho and para to halogen is occupied by one of the group consisting of nitro and trifluoromethyl, with an amine represented by the formula

in which $R_1$ is one of the group consisting of hydrogen and alkyl having 1 to 5 carbons, $R_2$ is one of the group consisting of alkyl having 1 to 5 carbons and aryl, the aryl radical being a member of the benzene and naphthalene series, said amination being carried out between temperatures of 20° and 180° C. until a nitro-trifluoromethyl-phenyl-amine is formed.

11. The process which comprises aminating a nitro-halo-benzotrifluoride containing not more than two nitro groups and not more than two trifluoromethyl groups, and in which at least one of the positions ortho and para to halogen is occupied by one of the group consisting of nitro and trifluoromethyl, with an amine represented by the formula

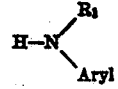

in which $R_1$ is one of the group consisting of hydrogen and alkyl having 1 to 5 carbons, and aryl is a member of the benzene and naphthalene series, said amination being carried out between temperatures of 20° and 180° C. until a nitro-trifluoromethyl-phenyl-amine is formed.

12. The process which comprises aminating a compound represented by the formula

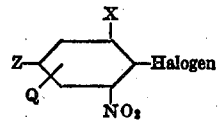

in which X is one of the group consisting of nitro and trifluoromethyl, Z is nitro when X is trifluoromethyl and is trifluoromethyl when X is nitro, and Q is one of the group consisting of hydrogen and trifluoromethyl, with an amine represented by the formula

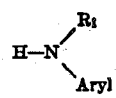

in which $R_1$ is one of the group consisting of hydrogen and alkyl having 1 to 5 carbons and aryl is a member of the benzene and naphthalene series, said amination being carried out between temperatures of 20° and 180° C. until a nitro-trifluoromethyl-phenyl-amine is formed.

HERBERT W. DAUDT.
HAROLD E. WOODWARD.